United States Patent Office 3,197,504
Patented July 27, 1965

---

3,197,504
CHLOROBENZALDEHYDE HYDRAZONES AND THEIR HYDRAZONIUM SALTS
John Harvey, Jr., Wilmington, Del., assignor to E. I. du Pont de Nemours and Company, Wilmington, Del., a corporation of Delaware
No Drawing. Filed Feb. 16, 1961, Ser. No. 89,612
9 Claims. (Cl. 260—566)

This invention relates to herbicides and more particularly to 2,6-di or 2,3,6-trichlorobenzaldehyde aliphatic hydrazones and their quaternary salts and to their use in herbicidal compositions.

The novel 2,6-dichlorobenzaldehyde or 2,3,6-trichlorobenzaldehyde aliphatic hydrazones which can be used in the herbicidal compositions of this invention have the general formula:

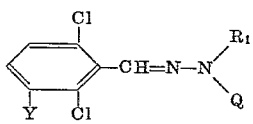

where Y is hydrogen or chlorine;
$R_1$ is hydrogen, allyl, propynyl, cycloalkyl of 3 to 8 carbons or alkyl of 1 to 6 carbons with 0 to 1 substituents selected from the group consisting of chloro, hydroxy and methoxy;
Q is alkyl of 1 to 18 carbons, allyl, propynyl, cycloalkyl of 3 to 8 carbons, alkyl of 1 to 6 carbons with 0–1 substituent selected from the group consisting of chloro, hydroxy and methoxy; and

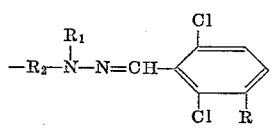

where $R_1$ and Y are defined as above and $R_2$ is dimethylene, tetramethylene, 2-butenylene, or 2-butynylene, Q can be taken together with $R_1$ to form a ring which can contain a heteroatom selected from the group consisting of nitrogen and oxygen.

The novel quaternary salts of these compounds which can be used have the general formula:

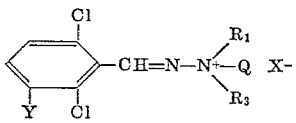

where
Y and Q are defined as above.
$R_1$ is allyl, propynyl, cycloalkyl of 3 to 8 carbons, or alkyl, of 1 to 6 carbons with 0 to 1 substituent selected from the group consisting of chloro, hydroxy and methoxy.
$R_3$ is alkyl of 1 to 6 carbons, allyl, or propynyl.
X is halide having an atomic weight of at least 35, methosulfate, or ethosulfate.

While any of the aliphatic hydrazones or their quaternary salts shown above can be used, it is preferred that $R_1$, $R_3$, and Q in the above general formulas be lower alkyl with Y being either hydrogen or chlorine.

The most preferred embodiments of this invention are the lower alkyl hydrazones and their quaternary salts in which the lower alkyl is methyl with Y being hydrogen such as 2,6-dichlorobenzaldehyde dimethylhydrazone, 2,6-dichlorobenzaldehyde methylhydrazone, 2,6-dichlorobenzaldehyde trimethylhydrazonium methosulfate.

The aliphatic hydrazones and their quaternary salts as described above are effective pre-planting, pre-emergence, and post-emergence herbicides. This herbicidal activity is accompanied by a high degree of selectivity with wild oats being especially susceptible to these compounds. A wide variety of weed species show marked retardation of growth as well as control following treatment with these chemicals. A number of brush species are also retarded by the compounds of this invention. The higher molecular weight aliphatic hydrazones and their quaternary salts also possess some bacteriological activity.

If desired, the herbicidal composition which is used can include, in addition to a compound or compounds of the present invention, other herbicides or treating agents for weed or plant growth.

The compounds of the present invention are prepared by reacting 2,6-dichlorobenzaldehyde or 2,3,6-trichlorobenzaldehyde with a suitably substituted hydrazine. The reaction is catalyzed by most any acid such as hydrochloric acid, acetic acid, or p-toluenesulfonic acid and can be conveniently carried out in benzene, wherein the water formed in the reaction is removed by azeotropic distillation.

The apliphatic hydrazones as prepared above are oils or solids with melting points in the range of 25–175° C. They are insoluble in water and possess moderate solubility in oils.

2,6-dichlorobenzaldehyde is prepared by the hydrolysis of 2,6-dichlorobenzal chloride as described by G. Stork and William N. White, J.A.C.S., 78, 4615 (1956).

Many substituted hydrazines such as methyl hydrazine and 1,1-dimethylhydrazine are available commercially. Unsymmetrical disubstituted hydrazines can be prepared by nitrosation of the appropriate secondary amine followed by reduction of the nitroso group to the primary amino group of the hydrazine as described in Organic Synthesis II, 211. High-molecular weight monoalkylhydrazines, such as six carbons and above, can be made from anhydrous hydrazine and alkyl halides in a manner similar to the alkylation of amines, described by Westphal, Ber., 74, 759 (1941). Monoalkylhydrazines from two to six carbons can be prepared by heating amines with hydroxylamine-O-sulfonic acid in the presence of alkali as described by Gever and Hayes, J. Org. Chem., 14, 813 (1949).

The quaternary salts of aliphatic hydrazones are prepared by the reaction of an aliphatic hydrazone as prepared above with an aliphatic halide or sulfate. The halide preferably has an atomic weight of at least 35 and the aliphatic sulfate is preferably methyl or ethyl sulphate. The reactants can be heated together in equimolar quantities, or the aliphatic hydrazone can be refluxed with an excess of the aliphatic halide or sulfate. In some cases it is convenient to carry out the reaction in an inert solvent with a B.P. between 35–120° C. such as methanol, ethanol or acetonitrile.

The quaternary aliphatic hydrazones are crystalline solids of moderate M.P. in the range of 75–200° C. They are soluble in water, methanol, and ethanol and are insoluble in oils.

EXAMPLE 1

To a stirred solution of 88 g. (0.5 mole) 2,6-dichlorobenzaldehyde
250 ml. benzene
2.5 ml. glacial acetic acid is added slowly 37 g. (0.6 mole) 1,1-dimethylhydrazine. The temperature rises spontaneously from room temperature to 50° C. The mixture is then heated to reflux for 1 hour while the water formed during the reaction is removed by azeotropic distillation. By evaporation of the solvent under reduced pressure, a quantitative yield of the dimethylhydrazone of 2,6-dichlorobenzaldehyde is obtained as a yellow oil, $n_D^{25}$ 1.6042.

EXAMPLE 2

17.5 g. (0.1 mole) 2,6-dichlorobenzaldehyde
75 ml. benzene
0.25 ml. concentrated hydrochloric acid To a stirred mixture of these reactants, 7.5 g. (0.125 mole) 1,1-dimethylhydrazine is added slowly. The temperature rises spontaneously to 46° C. After boiling for 1 hour with azeotropic distillation of the water formed, the product is obtained, after evaporation of the solvent, as a yellow oil, $n_D^{25}$ 1.6056 calcd. for $C_9H_{10}Cl_2N_2$: C, 49.8; H, 4.6. Found: C, 49.47; H, 4.78.

EXAMPLE 3

21 g. (0.1 mole) 2,3,6-trichlorobenzaldehyde
10.2 g. (0.1 mole) n-amylhydrazine

Reactants are stirred together and heated slowly to 75° C., where the temperature is maintained for 1 hour. The reaction mixture is dissolved in ether, dried over anhydrous magnesium sulfate, and evaporated under reduced pressure. The crude product may be purified by distillation under reduced pressure.

EXAMPLES 4–14

Using the methods described above, there are prepared the compounds of Table I. The reactants, the amount of each employed, the number of the reference example, and the structural formula of the resulting product are set forth in this table.

*Table I*

| Example | Reactants | Method of Example No. | Product |
|---|---|---|---|
| 4 | (0.1 mole) 2,6-dichlorobenzaldehyde<br>(0.1 mole) $CH_2=CH-CH_2\overset{NH_2}{\underset{|}{N}}-(CH_2)_{17}CH_3$ | 1 | $2,6\text{-}Cl_2C_6H_3CH=NN\diagdown_{(CH_2)_{17}CH_3}^{CH_2CH=CH_2}$ |
| 5 | (0.1 mole) 2,6-dichlorobenzaldehyde<br>(0.1 mole) $CH_3(CH_2)_5\overset{NH_2}{\underset{|}{N}}CH_3$ | 1 | $2,6\text{-}Cl_2C_6H_3CH=NN\diagdown_{(CH_2)_5CH_3}^{CH_3}$ |
| 6 | (0.1 mole) 2,6-dichlorobenzaldehyde,<br>(0.1 mole) $CH_3\overset{NH_2}{\underset{|}{N}}-(CH_2)_{15}CH_3$ | 1 | $2,6\text{-}Cl_2C_6H_3CH=NN\diagdown_{(CH_2)_{15}CH_3}^{CH_3}$ |
| 7 | (0.1 mole) 2,6-dichlorobenzaldehyde,<br>(0.05 mole) $H_2N\overset{CH_3}{\underset{|}{N}}CH_2CH_2\overset{CH_3}{\underset{|}{N}}NH_2$ | 2 | $(2,6\text{-}Cl_2C_6H_3CH=N\overset{CH_3}{\underset{|}{N}}CH_2-)_2$ |
| 8 | (0.1 mole) 2,3,6-trichlorobenzaldehyde<br>(0.1 mole) $CH_3NHNH_2$ | 2 | $2,3,6\text{-}Cl_3C_6H_2CH=NNHCH_3$ |
| 9 | (0.1 mole) 2,3,6-trichlorobenzaldehyde<br>(0.1 mole) $CH\equiv CCH_2\overset{NH_2}{\underset{|}{N}}CH_3$ | 3 | $2,3,6\text{-}Cl_3C_6H_2CH=NN\diagdown_{CH_2C\equiv CH}^{CH_3}$ |
| 10 | (0.2 mole) 2,3,6-trichlorobenzaldehyde<br>(0.1 mole) $NH_2\overset{CH_3}{\underset{|}{N}}CH_2CH_2CH_2CH_2\overset{CH_3}{\underset{|}{N}}NH_2$ | 3 | $2,3,6\text{-}Cl_3C_6H_2CH=N\overset{CH_3}{\underset{|}{N}}CH_2CH_2-)_2$ |
| 11 | (0.1 mole) 2,6-dichlorobenzaldehyde<br>(0.005 mole) $NH_2\overset{C_2H_5}{\underset{|}{N}}CH_2CH=CHCH_2\overset{C_2H_5}{\underset{|}{N}}NH_2$ | 3 | $(2,6\text{-}Cl_2C_6H_3CH=N\overset{C_2H_5}{\underset{|}{N}}CH_2CH=)_2$ |
| 12 | (0.1 mole) 2,6-dichlorobenzaldehyde<br>(0.1 mole) $CH_3(CH_2)_{17}NHNH_2$ | 1 | $2,6\text{-}Cl_2C_6H_3CH=NNH\,(CH_2)_{17}CH_3$ |
| 13 | (0.1 mole) 2,6-dichlorobenzaldehyde<br>(0.1 mole) $CH_3CH_2\overset{NH_2}{\underset{|}{N}}CH_2CH=CH_2$ | 1 | $2,6\text{-}Cl_2C_6H_3CH=NN\diagdown_{CH_2CH=CH_2}^{CH_2CH_3}$ |
| 14 | (0.1 mole) 2,6-dichlorobenzaldehyde<br>(0.1 mole) $CH_2=CHCH_2NHNH_2$ | 1 | $2,6\text{-}Cl_2C_6H_3CH=NNHCH_2CH=CH_2$ | weed control adjuvants or modifiers. The herbicidal compositions of the aliphatic hydrazones can be in the form of wettable powders, granules, pellets, emulsifiable oil concentrates, oil solutions, and aqueous dispersions. Herbicidal compositions of the quaternary salts of the aliphatic hydrazones can be in the form of wettable powders, granules, emulsions, and aqueous solutions. A herbicidal composition containing both an aliphatic hydrazone and a quaternary salt of an aliphatic hydrazone can be also compounded into one of the above forms, the best one depending upon the physical properties of the mixed hydrazone and quaternary salt.

While the herbicidal compositions of this invention can be formulated in any conventional manner, it is much preferred that they be formulated in compositions which contain a surface active agent, a finely divided carrier or both.

The finely divided carrier can be any of the powers commonly employed in the insecticide, herbicide and fungicide art and can include natural clays such as attapulgite and kaolinite clays, diatomacious earth, talcs, synthetic mineral fillers derived from silica and silicate such as synthetic fine silica and synthetic calcium or magnesium silicate, wood flour, and walnut shell flour.

The amount of the finely divided carrier can vary widely and can range from 10 to 98 percent by weight of a herbicidal composition. The particle size can vary considerably but will ordinarily be somewhat under 50 microns in the finished formulation.

Herbicidal compositions as described can, in addition to the finely divided carrer, contain a surfactant. This surfactant can be a wetting agent, a dispersant, a defoamer or an emulsifying agent which will assist dispersion of the composition in water. Suitable surfactants can include cationic, anionic and non-ionic surfactants and are set out, for example, in Searle U.S. Patent 2,426,-417, Todd U.S. Patent 2,655,447, Jones U.S. Patent 2,412,510, or Lenher U.S. Patent 2,139,276. It is obvious that if any wetting agent is needed to improve the rate of solution of the quaternary forms of the invention it must be cationic or non-ionic since anionic agents would react with the quaternary. On the other hand, anionic surfactants may function satisfactorily with highly insoluble hydrazones.

Suitable wetting agents for use in compositions of this invention are alkyl and alkyl aryl polyether alcohols, polyoxyethylene sorbitol or sorbitan fatty acid esters, polyethylene glycol fatty esters and fatty alkylol amide condensates.

In general, less than 10% by weight of the wetting agent will be used in compositions of this invention and ordinarily the amount of wetting agent will be less than 19% by weight. Usually, in accordance with customary practices, the amount will range from about 0.5 to 2% of a wetting agent.

Wihle formulations containing a surfactant with or without an added finely divided carrier are much preferred compositions of this invention, it will be understood that the aliphatic hydrazones and quaternary salts of aliphatic hydrozones can be used in the compositions of this invention by formulation in various conventional manners.

The aliphatic hydrazones and quaternary salts of aliphatic hydrazones can also be dissolved in appropriate non-phytotoxic organic solvents. A concentrate thus formed can be mixed with water, using an emulsifying agent if one is necessary. Suitable solvents include lower molecular weight aromatic hydrocarbons usually benzene, toluene, xylene and alkylated naphthalene, low molecular weight alcohols and esters, and water immiscible ketones.

Emulsifiable oils can be prepared in the same fashion using an oil in which the aliphatic hydrazone is soluble, such as diesel oil.

As will be shown in the examples and has been shown generally above, the aliphatic hydrazones employed in herbicidal compositions are effective for the control of some brush species, give excellent pre-emergence control of crabgrass, giant foxtail, wild carrot, mustard, and wild oats.

EXAMPLE 41

2,3,6-trichlorobenzaldehyde n-amylhdrazone is formulated into the following pellet composition by intimately mixing the components with a very small amount of water in a ribbon blender and extruding the resulting paste under high pressure through a ⅛ inch diameter die and cutting the extrusion into ⅛ inch lengths:

| | Percent |
|---|---|
| 2,3,6-trichlorobenzaldehyde n-amylhydrazone | 25 |
| Anhydrous sodium sulfate | 10 |
| Non-gelling kaolin clay | 65 |

These pellets are applied at a rate of 10 to 15 lbs. per acre of active ingredient around the base of young hardwood brush species growing under power lines. A marked retardation in growth rate is noted.

EXAMPLE 42

2,6-dichlorobenzaldehyde dimethylhydrazone is formulated into a wettable powder of the following composition by combining the dry components, blending in a ribbon blender, micropulverizing in a hammer mill until substantially all the product is below 50 microns in particle size and reblending the product in a ribbon blender.

| | Percent |
|---|---|
| 2,6-dichlorobenzaldehyde dimethylhydrazone | 35 |
| Dry synthetic calcium silicate ("Micro-Cel" 805) | 63 |
| Alkyl aryl sulfonate | 1.75 |
| Methyl cellulose | 0.25 |

When dispersed in water and applied at a rate of 6 pounds of active ingredient per acre, excellent pre-emergence control of crabgrass, giant foxtail, and wild carrot is obtained in ornamentals such as arborvitae, yew, and firethorn.

EXAMPLE 43

The following emulsifiable oil herbicidal composition is prepared by mixing the listed ingredients until a homogeneous solution is formed.

| | Percent |
|---|---|
| 2,6-dichlorobenzaldehyde allyloctadecyl-hydrazone | 20 |
| n-Butyl alcohol | 12 |
| Alkylated naphthalene | 10 |
| Polyoxyethylene laurylether | 8 |
| Diesel oil | 50 |

This composition is extended with 100 gallons of an herbicidal oil to form a sprayable oil formulation containing 2% by weight of active ingredient. When sprayed from a railroad spray car along railroad right-of-way at a rate of 16 pounds per acre of the active ingredient excellent control of mixed vegetation containing crabgrass, flower-of-an-hour, ragweed, cocklebur, and lamb's quarters is obtained.

EXAMPLE 44

| | Percent |
|---|---|
| 2,6-dichlorobenzaldehyde dimethylhydrazone | 20 |
| n-Butyl alcohol | 12 |
| Alkylated naphthalene | 10 |
| Polyoxyethylene lauryl ether | 8 |
| Diesel oil | 50 |

This emulsifiable oil composition is prepared by mixing the ingredients until a homogeneous solution is obtained.

It is extended with 20 gallons of water and applied at a rate of 4 pounds (active) per acre preemergence to grasses (wild oats, crabgrass, and volunteer annual rye grass) and wild carrot in potatoes. Excellent control is obtained.

EXAMPLE 15

2,6 - dichlorobenzaldehyde dimethylhydrazone (10 parts) methyl iodide (7 parts), and methanol (25 parts) each employed, the number of the example, and the structural formula of the resulting product are set forth in this table.

*Table II*

| Example No. | Hydrazone of Example No. | Quaternizing Agent | Solvent | Product |
|---|---|---|---|---|
| 18 | 1 (0.1 mole) | $BrCH_2CH_2Br$ (0.05 mole) | $CH_3OH$ | $[2,6\text{-}Cl_2C_6H_3CH=\overset{++}{\underset{CH_3}{\overset{CH_3}{N}}}NCH_2\text{-}]_2 2Br^-$ |
| 19 | 10 (0.1 mole) | $CH_3I$ (0.1 mole) | $CH_3OH$ | $[2,3,6\text{-}Cl_3C_6H_2CH=\overset{++}{\underset{CH_3}{\overset{CH_3}{N}}}NCH_2CH_2\text{-}]_2 2I^-$ |
| 20 | 9 (0.1 mole) | $CH_3(CH_2)_5Br$ (0.1 mole) | $CH_3CN$ | $2,3,6\text{-}Cl_3C_6H_2CH=\overset{+}{\underset{(CH_2)_5CH_3}{\overset{CH_2C\equiv CH}{N}}}N\text{-}CH_3 \quad Br^-$ |
| 21 | 4 (0.1 mole) | $CH_2=CHCH_2Cl$ (0.1 mole) | $CH_3OH$ | $2,6\text{-}Cl_2C_6H_3CH=\overset{+}{\underset{CH_2CH\equiv CH_2}{\overset{CH_2CH=CH_2}{N}}}N\text{-}(CH_2)_{17}CH_3 \quad Cl^-$ |
| 22 | 5 (0.1 mole) | $CH\equiv CCH_2Cl$ (0.1 mole) | $CH_3OH$ | $2,6\text{-}Cl_2C_6H_3CH=\overset{+}{\underset{CH_2C\equiv CH}{\overset{(CH_2)_5CH_3}{N}}}NCH_3 \quad Cl^-$ |
| 23 | 13 (0.1 mole) | $CH_3I$ (0.1 mole) | None | $2,6\text{-}Cl_2C_6H_3CH=\overset{+}{\underset{CH_2CH=CH_2}{\overset{CH_2CH_3}{N}}}NCH_3 \quad I^-$ |
| 24 | 5 (0.1 mole) | $(CH_3)_2SO_4$ (1 mole) | do | $2,6\text{-}Cl_2C_6H_3CH=\overset{+}{\underset{CH_3}{\overset{(CH_2)_5CH_3}{N}}}NCH_3 \cdot CH_3SO_4^-$ |
| 25 | 3 (0.1 mole) | $CH_3I$ (1 mole) | do | $2,3,6\text{-}Cl_3C_6H_2CH=\overset{+}{\underset{C_6H_{11}}{\overset{CH_3}{N}}}N\text{-}CH_3 \quad I^-$ | are heated under reflux for 5 hours. After heating is discontinued, anhydrous ethyl ether is added to the mixture until a second phase begins to separate. The mixture is cooled, and the white crystalline precipitate collected on a Buchner funnel. Product can be purified by recrystallization from ethanol. M.P. 175–177° C. (dec.).

Calculated for $C_{10}H_{13}Cl_2N_2O \cdot H_2O$: C, 31.72; H, 4.14. Found: C, 31.8; H, 4.0.

EXAMPLE 16

2,6 - dichlorobenzaldehyde dimethylhydrazone (22 parts), dimethylsulfate (6.3 parts) and methanol (25 parts) are heated under reflux for 22 hours. After heating is discontinued, anhydrous ethyl ether is added to the mixture until a second phase begins to separate. The mixture is cooled and the white crystalline precipitate collected on a filter. Product can be purified by recrystallization from ethanol ether. M.P. 129–132° C.

Calculated for $C_{11}H_{16}Cl_2N_2O_4S$: C, 38.5; H, 4.67. Found: C, 38.71; H, 4.76.

EXAMPLE 17

2,6 - dichlorobenzaldehyde dimethylhydrazone (22 parts), 1,4-dichlorobutene-2 (6.3 parts), and methanol (25 parts) are heated together under reflux for 22 hours. The mixture is cooled to 40° C., mixed with 20 ml. anhydrous ethyl ether, and chilled. A white crystalline precipitate separates and is collected on a filter. After recrystallization from ethanol ether, the product melts at 179–181° C.

Calculated for $C_{22}H_{26}Cl_6N_4$: C, 47.2; H, 4.7. Found: C, 47.3; H, 5.4.

EXAMPLES 18–25

Using the method described above, there are prepared the compounds of Table II. The reactants, the amount of each employed, the number of the example, and the structural formula of the resulting product are set forth in this table.

Using the techniques of the above examples, the following additional compounds can be prepared.

(26) 1,1'-(2-butenylene)bis(1-methyl-hydrazine), 1:2 hydrazone with 2,6 dichlorobenzaldehyde.

(27) 1,1'-ethylenebis(1-ethylhydrazine), 1:2 hydrazone with 2,6-dichlorobenzaldehyde.

(28) Piperidine, 1-(2,6-dichlorobenzylideneamino).

(29) Piperidinium, 1-(2,6-dichlorobenzylideneamino)-1-methyl iodide.

(30) 2,6-dichlorobenzaldehyde, hydrazone with 1-methyl-1-cyclohexylhydrazine.

(31) 2,6-dichlorobenzaldehyde, hydrazone with 1,1-dimethyl-1-cyclohexyl-hydrazonium iodide.

(32) 2,6-dichlorobenzaldehyde, hydrazone with 1-methyl-1-cyclopentylhydrazine.

(33) 2,6-dichlorobenzaldehyde, hydrazone with 1,1-dicyclohexylhydrazine.

(34) 2,6-dichlorobenzaldehyde, hydrazone with 1,1-diallylhydrazine.

(35) 2,6-dichlorobenzaldehyde, hydrazone with N-aminomorpholine.

(36) 2,6-dichlorobenzaldehyde, hydrazone with N-aminopiperazine.

(37) 2,6-dichlorobenzaldehyde, hydrazone with 1,1-dimethyl-1-cyclopropylhydrazonium iodide.

(38) 2,6-dichlorobenzaldehyde, hydrazone with 1,1-diallyl-1-methylhydrazonium methosulfate.

(39) 2,6-dichlorobenzaldehyde, hydrazone with 1,1-dicyclohexyl-1-allylhydrazonium bromide.

(40) Morpholinium, 1-(2,6 - dichlorobenzylideneamino)-1-methyl iodide.

Herbicidal compositions of the present invention can be prepared by admixing one or more of the aliphatic hydrazones or their quaternary salts as described above with

EXAMPLE 45

| | Percent |
|---|---|
| 2,6-dichlorobenzaldehyde dimethylhydrazone | 2 |
| Granular expanded vermiculite | 98 |

The above composition is prepared by warming the liquid hydrazone to reduce viscosity and spraying with a fog spray on the vermiculite while tumbling the latter.

Utilizing a conventional granular spreader, the above composition is broadcast at the rate of 200 pounds per acre for pre-emergence control of crabgrass, rye grass, lamb's-quarters, mustard and wild carrot in ornamental nursery plantings, such as black spruce, arborvitae, privet, and Lombardy poplar. Excellent weed control is obtained.

EXAMPLE 46

2,6-dichlorobenzaldehyde trimethylhydrazonium iodide is dissolved in 100 gallons water and applied at the rate of 2 to 3 pounds of active ingredient per acre to cropland infested with wild oat seeds. Immediately after treatment, usually in the early spring, the herbicidal material is incorporated into the surface 3-inches of soil. The wild oat seedlings penetrate the soil surface and die shortly thereafter. After the chemical residues have dissipated in the soil, flax, rape, wheat, or barley is grown without visible injury.

At the rate of 3 to 4 pounds active ingredient per acre excellent pre-emergency control of crabgrass, giant foxtail, mustard and pigweed is obtained in a field planted to Black Valentine beans.

EXAMPLE 47

| | Percent |
|---|---|
| 2,6 - dichlorobenzaldehyde, trimethylhydrazonium methosulfate | 80 |
| Synthetic fine silica | 20 |

The above non-caking wettable powder is prepared by blending the components and passing through a micropulverizer. When added to water, the active component dissolves, leaving silica in suspension.

The above formulation at the rate of 2 to 3 pounds of active ingredient per acre (in 30 gallons water) gives effective post-emergence control of wild oats (2 leaf stage) when applied as a directed spray in established crops of potatoes or rape.

It is also effective for control of wild oats when used as described in Example 31.

EXAMPLE 48.—HIGH STRENGTH GRANULE

| | Percent |
|---|---|
| 2,6-dichlorobenzaldehyde n-hexylmethylhydrazone | 20 |
| Granular 8–15 mesh attapulgite | 80 |

The above composition is prepared by warming the active until it is a low viscosity liquid then spraying this liquid upon the tumbling granules in a cement type mixer.

This formulation is applied with a granular spreader at the rate of 10 pounds active for the pre-emergence control of crabgrass, giant foxtail, Johnson grass, and barnyard grass infestations along roadsides. Excellent control is obtained.

EXAMPLE 49.—GRANULAR FORM OF WATER SOLUBLE HERBICIDE

| | Percent |
|---|---|
| 2,6 - dichlorobenzaldehyde n-hexylmethylpropynylhydrazonium chloride | 5 |
| 4–8 mesh granular, expanded vermiculite | 95 |

The above composition is prepared by dissolving the active component in water and spraying the solution upon the vermiculite while it is tumbled to obtain uniform distribution. The product is then dried.

The above formulation is applied with a specially-adapted tractor spreader at the rate of 4 pounds per acre for pre-emergence control of weedy grasses, such as crabgrass, giant foxtail, and barnyard grass, as well as lamb's-quarters and pigweed in a field of safflower. Excellent weed control is noted.

The compounds as shown in Examples 1 to 40 can be formulated in each of the ways shown above.

EXAMPLE 50

| | Percent |
|---|---|
| 2,3,6-trichlorobenzaldehyde-dimethyl hydrazone | 25 |
| Dioctyl sodium sulfosuccinate (85–15) reaction product with sodium benzoate | 1 |
| Partially desulfonated Ca lignin sulfonate | 2 |
| Attapulgite clay | 62 |
| Synthetic fine silica | 10 |

The above formulation is applied in 45 gallons water at the rate of 8–12 pounds (active) per acre for pre-emergence control of annual weeds along the edge of sidewalks. Good control of ryegrass, crabgrass, mustard, pigweed, and wild carrot is obtained.

Thus in each of the Examples 41 to 50 above, the aliphatic hydrazone or quaternary salt of an alphatic hydrazone therein named can be replaced with an equal weight of the aliphatic hydrazone or quaternary salt of an aliphatic hydrazone of Examples 1 to 40 and applied as shown.

What is claimed is:

1. A compound selected from the group consisting of the formula:

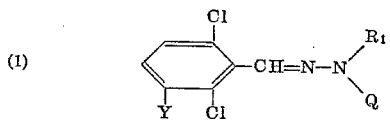

(1)

where

Y is selected from the group consisting of hydrogen and chlorine, $R_1$ is selected from the group consisting of hydrogen, allyl, propynyl, cycloalkyl of 3 to 8 carbons, and alkyl of 1 to 6 carbons and Q is selected from the group consisting of alkyl of 1 to 18 carbons, allyl, propynyl, cycloalkyl of 3 to 8 carbons and

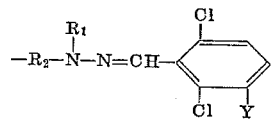

where $R_1$ and Y are defined as above and $R_2$ is selected from the group consisting of dimethylene, tetramethylene, and 2-butenylene and Q when taken together with $R_1$ forms a 6 member heterocyclic substituent having at least one heteroatom selected from the group consisting of nitrogen and oxygen; and

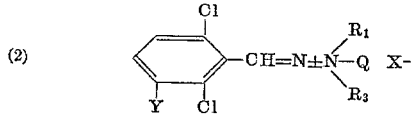

(2)

where

Y and Q are as defined above, $R_1$ is selected from the group consisting of allyl, propynyl, cycloalkyl and 3 to 8 carbons, and alkyl of 1 to 6 carbons, $R_3$ is selected from the group consisting of allyl, propynyl, and alkyl of 1 to 6 carbons and, X is an anion selected from the group consisting of chloride, bromide, iodide, methosulfate, and ethosulfate and Q when taken together with $R_1$ forms a 6 member heterocylic substituent having at least one heteroatom selected from the group consisting of nitrogen and oxygen.

2. 2,6-dichlorobenzaldehyde lower alkyl hydrazone.

3. 2,3,6-trichlorobenzaldehyde lower alkyl hydrazone.

4. 2,6-dichlorobenzaldehyde tri-lower alkyl hydrazonium salt where the anion is selected from the group consisting of chloride, bromide, iodide, methosulfate, and ethosulfate.

5. 2,3,6-trichlorobenzaldehyde tri-lower alkyl hydrazonium salt where the anion is selected from the group consisting of chloride, bromide, iodide, methosulfate, and ethosulfate.

6. Bis-quaternary salt with 1,4-dichlorobutene-2 of 2,6-dichlorobenzaldehyde lower alkyl hydrazone.

7. 2,6-dichlorobenzaldehyde dimethylhydrazone.

8. 2,6-dichlorobenzaldehyde trimethylhydrazonium iodide.

9. 1,1-[2-butenylene bis (1,1-dimethylhydrazonium)] dichloride 1',2-hydrazone with 2,6-dichlorobenzaldehyde.

References Cited by the Examiner

UNITED STATES PATENTS

| | | | |
|---|---|---|---|
| 2,665,202 | 1/54 | Mowry et al. | 71—2.3 |
| 2,703,751 | 3/55 | Sharp | 260—566 |
| 2,786,044 | 3/57 | Warner et al. | 260—566 X |
| 2,828,198 | 3/58 | Harris et al. | 71—2.3 |
| 2,875,053 | 2/59 | Minsk | 260—566 X |
| 2,883,423 | 4/59 | Saunders | 260—566 |
| 2,909,567 | 10/59 | Rudner | 260—569 |
| 2,999,112 | 9/61 | Mosher et al. | 260—566 |

OTHER REFERENCES

Lock et al., Ber. Deut. Chem., vol. 76, pp. 1252–1256 (1943).

Wiley et al., J. Org. Chem., vol. 24, pp. 1925–1928 (1959).

CHARLES B. PARKER, *Primary Examiner.*

LEON ZITVER, JOSEPH P. BRUST, *Examiners.*